United States Patent [19]

Wech

[11] 4,261,779

[45] Apr. 14, 1981

[54] INDEXING ROLL DRIVE SYSTEM

[75] Inventor: Robert J. Wech, Green Bay, Wis.

[73] Assignee: FMC Corporation, San Jose, Calif.

[21] Appl. No.: 60,305

[22] Filed: Jul. 25, 1979

Related U.S. Application Data

[62] Division of Ser. No. 824,938, Aug. 15, 1977, Pat. No. 4,192,705.

[51] Int. Cl.[3] .................... B31B 19/60; B65H 16/22; F16H 27/04

[52] U.S. Cl. .................................. 156/251; 493/189; 493/267; 156/510; 156/538; 156/553; 156/583.1; 156/583.5; 226/8

[58] Field of Search .................... 156/250.1, 510, 515, 156/583.1, 583.5, 538, 553; 93/33 H

[56] References Cited

U.S. PATENT DOCUMENTS

| | | | |
|---|---|---|---|
| 3,663,338 | 5/1972 | Wech | 156/515 |
| 3,902,954 | 9/1975 | Lotto | 156/583.1 |
| 4,019,947 | 4/1977 | Stock | 156/515 |
| 4,065,344 | 12/1977 | Weist | 156/510 |
| 4,101,369 | 7/1978 | Adams | 156/510 |
| 4,105,489 | 8/1978 | Lotto | 156/583.1 |

*Primary Examiner*—Caleb Weston
*Attorney, Agent, or Firm*—L. J. Pizzanelli; A. J. Moore

[57] ABSTRACT

A short dwell indexing drive system for intermittently moving a web of thermosealing material through a bag machine includes a conjugate cam defined by a pair of disc cams on a continuously driven input or cam shaft which engage cooperating groups of cam followers on an intermittently driven output shaft that yields one web draw/dwell cycle for each revolution of the cam shaft. In the preferred embodiment the contour of the cams smoothly index the web by first accelerating the output shaft from zero velocity through a relatively low peak velocity and thereafter decelerating the web to zero velocity at a point in the cycle in excess of 180° before the output shaft is held stationary to the end of the cycle during a dwell period. Belt drives and an adjustable jackshaft which allows the use of different pulley ratios are connected between the output shaft and a web engaging draw roll for amplifying or reducing motion of the output shaft and for providing articles such as bags of different sizes.

If articles such as heat sealed thermoplastic pouches are to be made from webs of thermosealing material or laminate, the drive system may be modified by changing the cam configuration to provide a long dwell that requires in excess of 180° of each cycle of operation with the remaining portion of the cycle being used to advance the web.

9 Claims, 7 Drawing Figures

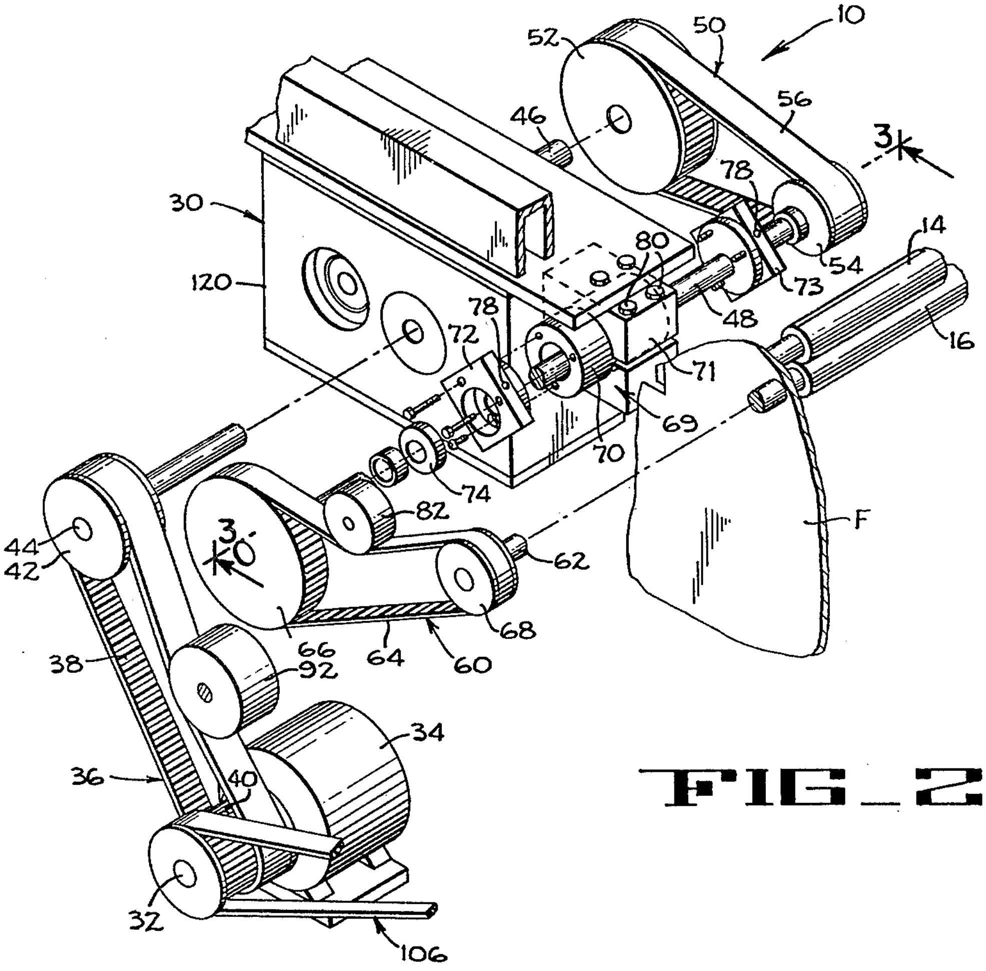
FIG_2
FIG_3
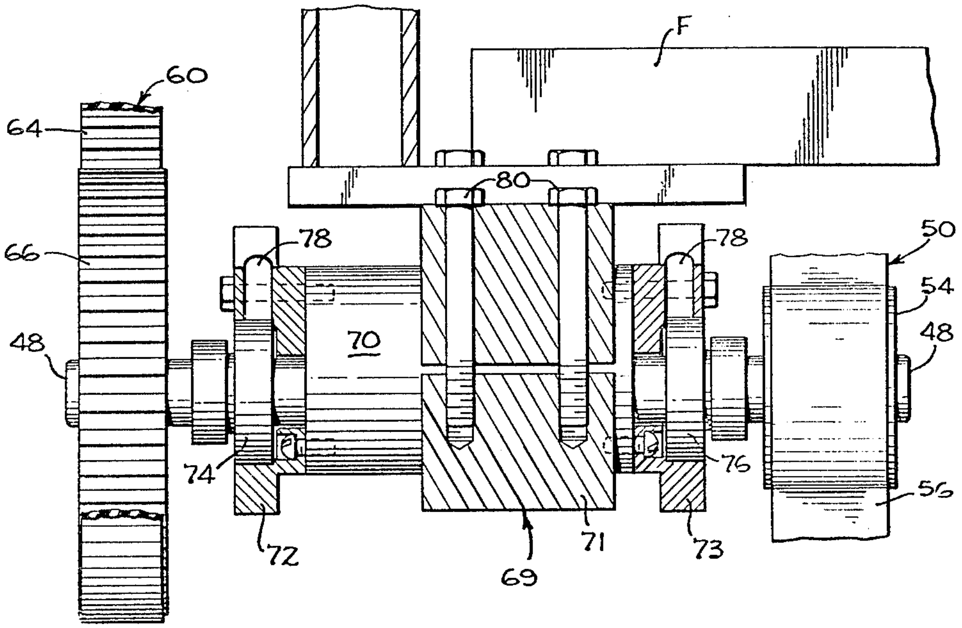

FIG_4
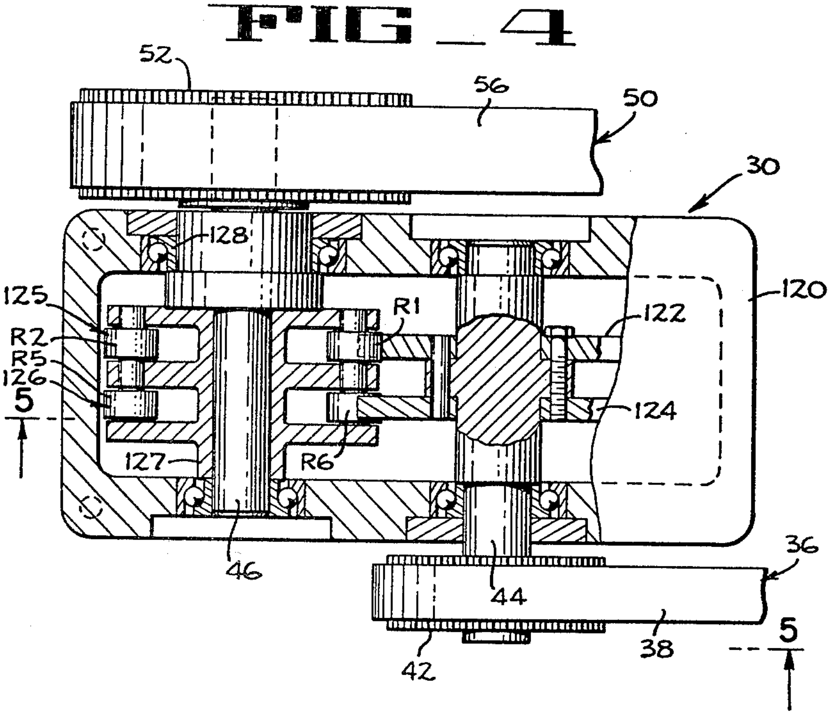
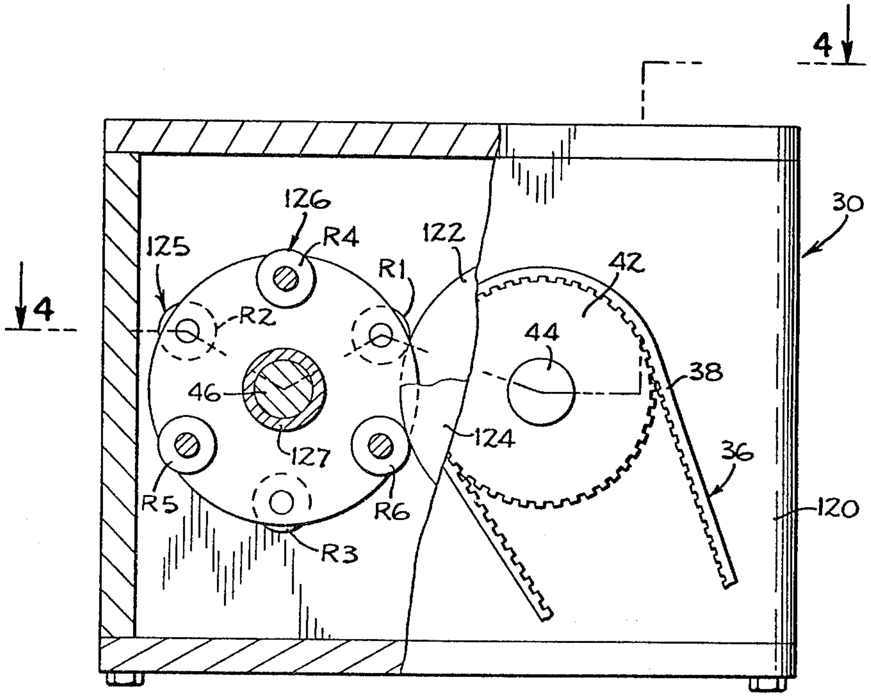
FIG_5

INDEXING ROLL DRIVE SYSTEM

This is a division of application Ser. No. 824,938 filed Aug. 15, 1977; which application issued as U.S. Pat. No. 4,192,705 on Mar. 11, 1980.

BACKGROUND OF THE INVENTION

1. Field of the Invention

This invention relates to the bag making art and more particularly the preferred embodiment relates to a short dwell indexing drive system for intermittently moving a web of bag making material smoothly through the bag machine with the web advancing or indexing movement of each cycle being in excess of 180° of the cycle.

2. Description of the Prior Art

Bag making machines are well known in the art as evidenced by my U.S. Pat. No. 3,663,338 which issued on May 16, 1972 and which is incorporated by reference herein. In this prior art machine a web of thermosealing bag making material is engaged between draw rolls which are intermittently rotated to drive the web one bag length or width for each cycle of operation. The drive for the draw rolls comprises a continuously driven crank shaft which makes one complete revolution for each bag making cycle. A crank pin on the crank shaft is connected by a crank arm to a gear segment which moves forwardly through 180° of each cycle and rearwardly through the remaining 180° of each bag making cycle. A clutch-brake assembly is included in a drive train which connects the gear segment to the draw rolls. During the forward moving half cycle of the gear segment, the clutch is engaged and the brake is disengaged to drive the web forwardly in simple harmonic motion with the maximum web velocity being about 940 feet per minute for making 30 inch bags at the rate of 120 bags per minute. During the rearward moving half cycle of the gear segment the clutch is released and the brake is engaged thus holding the draw rolls stationary during a dwell period which is one-half of the bag making cycle. During the dwell a transverse heat seal and a severance operation take place to permit separation of a completed bag from the web.

U.S. Pat. No. 2,997,889 which issued to Schjeldahl et al on Aug. 29, 1961 discloses a similar draw roll drive which imparts harmonic motion to the web during only 180° of each cycle. In this machine a crank oscillates a drive shaft by means of a rack and pinion drive. A drive train from the oscillating drive shaft to the draw rolls includes a clutch-brake assembly which operates to drive or index the web forwardly through one half of the cycle of the drive shaft and to dwell through the other half of the cycle at which time transverse sealing is performed and the bag is severed from the web.

U.S. Pat. No. 3,776,804 which issued to Monahan et al on Dec. 4, 1973 discloses a short dwell draw roll drive system which includes a phased harmonic drive. The phased harmonic drive includes a pair of cranks on a continuously driven input or crank shaft having their crank pins angularly offset or out of phase with each other. Each crank pin is connected to a rack which rotates a pinion connected to a stub shaft thereby oscillating the associated stub shaft. Each stub shaft is connected to a draw roll through a clutch brake assembly that is disposed between the associated stub shaft and the draw roll. When the first stub shaft is at zero velocity just prior to forward movement, the clutch of its clutch brake assembly is engaged and remains engaged for a period in excess of 90° thus accelerating the draw roll drive shaft to its peak velocity at 90° in a forward direction and thereafter decelerating the drive shaft until its decelerating harmonic curve intersects the accelerating portion of the harmonic motion curve of the second stub shaft that is driven by the out of phase second crank. At this point and only this point of intersection of the two curves, either stub shaft, if clutched to the draw roll, would drive the web at the same speed. At this critical point, the first clutch is disengaged and the clutch of the second clutch-brake assembly is engaged to connect the second stub shaft to the draw roll. With the second clutch engaged, the draw roll again accelerates in harmonic motion to its peak velocity and thereafter decreases in velocity to zero velocity at a point somewhat beyond the 180° mark of the bag making cycle. When reaching the zero velocity point, the second clutch is disengaged and the brake is engaged to hold the drive shaft and draw roll in a dwell throughout the remainder of the bag making cycle at which time the bag making cycle is repeated for the next bag. Thus, the double harmonic drive provides a web feed or indexing motion which is in excess of 180° and a dwell that is less than 180° of the bag making cycle. However, the feed imparts two accelerating and decelerating motions to each bag with each bag moving through two high velocity peaks.

U.S. Pat. Nos. 2,986,949 which issued to Lancaster et al on June 6, 1961 and 3,525,268 which issued to Kenny on Aug. 25, 1970 discloses conjugate cam drives of the type employed by applicant in the indexing drive system of the present invention. The cam drives include a driven cam shaft having a pair of cams thereon. Each of the cams is in planar alignment with one of two series of equally spaced cam followers secured to an output shaft. The contour of the cams are designed so that both cams are at all times in firm engagement with one of the cam followers of its series thus eliminating substantially all backlash of the output shaft. The specific contour of the two cams, and the number of cam followers in each series determines the proportion of each cycle of the output shaft used for dwell and the motion characteristics of the portion of each cycle used for indexing. Since conjugate cam drives of this type are incorporated in the indexing roll drive system of the present invention, the disclosure of these patents are included by reference herein.

SUMMARY OF THE INVENTION

The short dwell indexing drive system of the preferred embodiment of the present invention comprises a continuously driven cam shaft having a pair of cams thereon each of which engages different ones of two groups of cooperating evenly spaced cam followers secured to an output shaft to intermittently drive the output shaft. The contour of the two cams provides a smooth acceleration of the output shaft from zero velocity to a relatively slow peak velocity which peak velocity is maintained until the indexing motion is terminated after first smoothly decelerating to zero velocity at a point in excess of 180° of the 360° bag making cycle. The intermittently driven output shaft is connected to a web driving roll without utilizing clutches or brakes which undesirably add inertia and must be rapidly engaged and disengaged with extremely precise timing.

In the illustrated clutch-brake free embodiment, timing belt drives are provided between the output shaft and an intermediate jackshaft and between the intermediate jackshaft and the draw rolls. The jackshaft is eccentrically mounted to provide different center-to-center distances between the pulleys of the belt drives thereby providing adjustment means for easily accommodating different pulley ratios. Thus, by proper selection of pulley and draw roll sizes, bags of different lengths may be produced. If short bags of a predetermined size are to be made, a single belt drive without any other intervening parts may be the sole drive interconnecting the draw roll to the output shaft.

The cam operated indexing drive system of the present invention eliminates all drive components between the cam driven output shaft and the draw rolls except for the belt drives mentioned above. The indexing drive system is very simple and reliable and its motion and short dwell characteristics also provides for the gentle advance of easily damaged webs of bag making material or the like. The components of the web drive system are very low in inertia, compared to the prior art devices, since a substantial amount of mass is eliminated at high velocity locations in the system, i.e., the clutch-brakes and rack and pinions are not present in the present system. Elimination of the clutch-brake assemblies also eliminates many maintenance problems, as well as critical timing problems involved in energizing the clutch and brakes at the proper moments. If the timing is not precise in these prior art devices, it will be appreciated that abrupt accelerating forces will be applied to the draw rolls. In addition to increased clutch/brake slippage and wear, this condition increases the possibility of slippage between the draw rolls and web thereby causing deterioration of web draw repeatability. The elimination of backlash by using a conjugal cam indexing unit is an important advancement since backlash which necessarily occurs in the prior art rack or gear segment and pinion drives was multiplied by other gearing or belt drives before its adverse effect was felt by the draw rolls and thus the web. The minimization of draw roll back lash significantly aids the production of accurately sized bags having good seal quality.

The incorporation of a controlled motion characteristic draw system that utilizes more than 180° of the bag making cycle enables production of a specified bag size at a specified rate with lower peaks, in both acceleration and velocity. This significantly reduces draw drive loadings and the belt velocities required in downstream equipment such as bag stackers or bag folders. Conversely, a specified bag can be produced at significantly higher rates for a given limitation of draw drive loading or belt velocity downstream.

The bag making machine draw roll drive as described hereinafter employs a short dwell indexing drive directly coupled to the draw rolls which maximizes production rates achievable when running unprinted webs of thermosealing bag making material. It will be understood that prior art print register control systems may be incorporated to modify the output of the short dwell indexer to maintain print registration. Incorporating a register control system will slightly increase the inertia of the indexing drive train although production rate potential is still expected to exceed that of prior art bag making machines by virtue of employing short dwell indexing.

Throughout this disclosure the singular term web is used for purposes of clarity, however, multiple webs are often processed by the bag making machine described herein and the drive would be applied in both single and multiple web bag machines.

Similarly, it is sometimes advantageous to have a relatively wide bag making machine designed for "split draw" or "twin lane" operation wherein two independent draw drive trains are operatively connected to their associated ends of web draw rolls having a bearing arrangement near the machine centerline that permits independent web drawing by each half of the draw rolls.

It is therefore one object of the present invention to provide a short dwell indexing roll drive system for smoothly imparting indexing motion to a web from zero velocity through a maximum velocity and back to zero velocity which indexing motion requires more than 180° of a cycle of operation.

Another object is to provide an indexing drive system having cams which provide a smooth acceleration of rolls for advancing a web from zero velocity through a relatively low peak velocity and decelerates the web to zero velocity at a point in excess of one-half of its cycle of operation.

Another object is to provide a cam operated drive mechanism which has a peak velocity that is less than two-thirds of the peak velocity of a harmonic motion drive system for moving the web through the same distance at the same production rate.

Another object is to provide a cam operated short dwell indexing drive system with capability to provide web segments of different lengths.

Another object is to provide a draw roll drive system which has minimized inertia in the indexing portion of the drive so as to enable maximization of production rate.

Another object is to provide a draw roll drive system which minimizes peak draw velocities and therefore enables maximization of production rate in applications where downstream belt velocities are a limitation.

Another object is to provide a bag maker draw roll drive which does not require the use of the clutch/-brake, the power supply therefor, nor complicated electronic controllers required when using clutch/brakes because of problems of critical timing adjustment; all of which result in high maintenance requirements that has been experienced with prior art bag making machines.

Another object is to incorporate an indexing drive system having minimized back lash into the draw roll drive of bag making machines to produce thermoplastic bags with better cut-off machine accuracy and higher quality seals than possible with prior art bag making machines.

Another object is to provide a bag maker draw roll drive system which is essentially mechanical in nature and does not require trained electronic service personnel and expensive instruments for servicing.

Another object is to provide a draw roll drive system capable of having its motion characteristics and dwell tailored to specific bag making application to achieve maximization of production rates attainable from intermittent draw style bag making machines.

Another object is to provide a modified indexing drive system for pouch making machines or the like by altering the profile of the conjugate cam to provide a cycle of operation that includes a long dwell requiring more than 180° of each cycle of operation with the indexing portion of each cycle being less than 180°.

BRIEF DESCRIPTION OF THE DRAWINGS

FIG. 2 is a diagrammatic perspective of the indexing drive of the present invention.

FIG. 3 is a section taken along lines 3—3 of FIG. 2 illustrating an eccentric mounting for a jackshaft.

FIG. 4 is a horizontal section taken along lines 4—4 of FIGS. 1 and 5 through the cam indexing unit when in its dwell position.

FIG. 5 is a vertical elevation partially in section taken along lines 5—5 of FIG. 4.

FIG. 7 is a cam diagram illustrating the performance of two long dwell cams for use with thick thermosealing materials or the like.

DESCRIPTION OF THE PREFERRED EMBODIMENT

Figure 1:
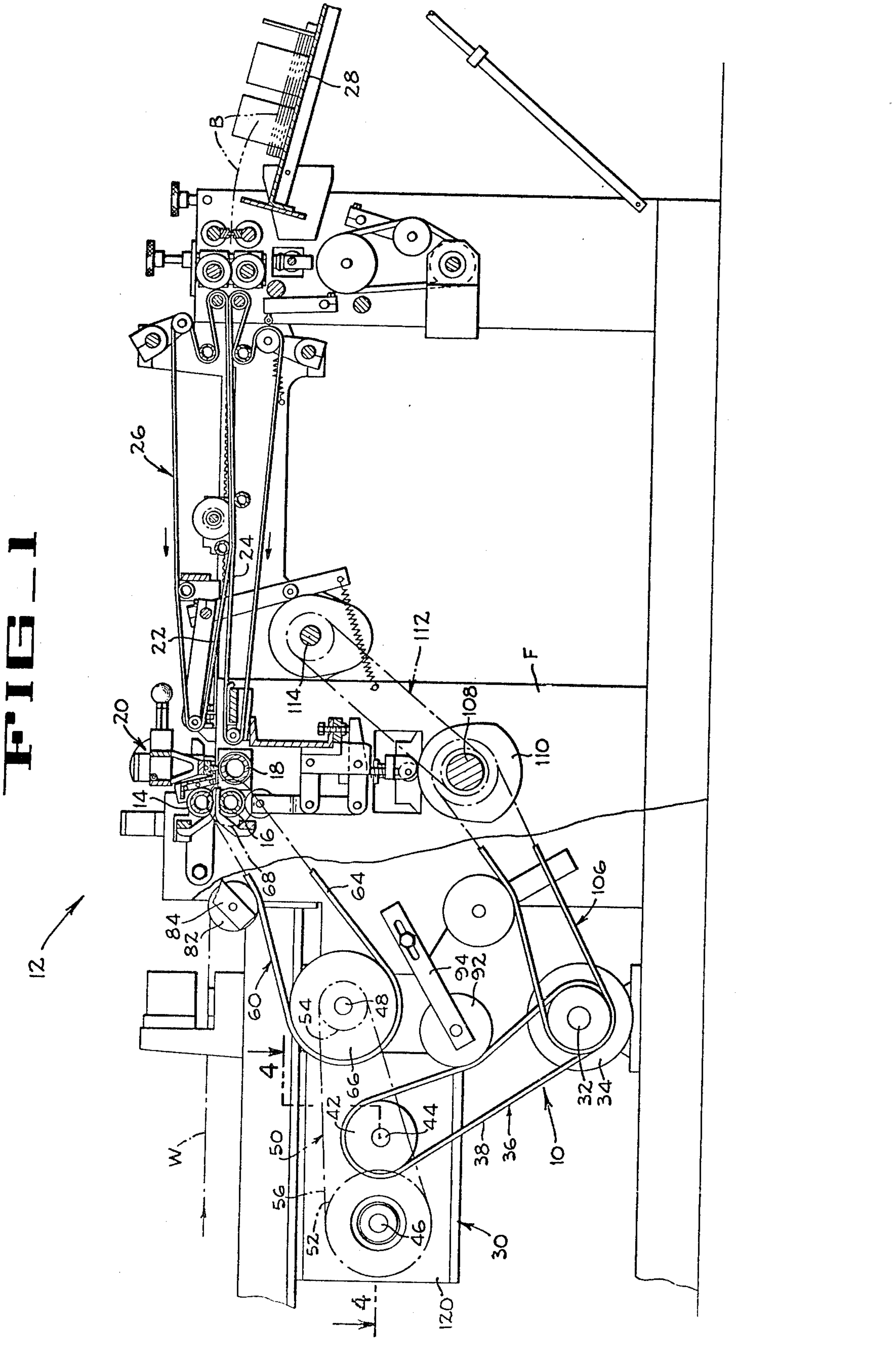
FIG. 1 is a side elevation of a portion of a bag machine in which the short dwell indexing drive system of the preferred embodiment of the present invention is incorporated.

The short dwell indexing roll drive system 10 (FIG. 1) of the preferred embodiment of the present invention is illustrated with a portion of a bag machine 12 of the type disclosed in my aforementioned U.S. Pat. No. 3,663,338.

The bag machine 12 receives a web W of bag making material, such as a thermosealing material, from supply rolls (not shown). The web W is engaged between an upper draw roll 14 and a lower draw roll 16. The draw rolls are intermittently driven to advance bag lengths or widths of the web W between a seal roll 18 and a vertically reciprocating driven sealing and severing head 20. The completed bags B are received between upper and lower belts 22,24 of a belt conveyor 26 which transports the bags B onto a stacking table 28 all as described in greater detail in my above mentioned patent which is incorporated by reference herein.

The roll drive system 10 of the present invention includes a conjugate cam drive unit 30 (FIGS. 1, 4 and 5) of the type manufactured by the Commercial Cam Division of Emerson Electric Company, 400 North Ashland Avenue, Chicago, Ill. Although the unit 30 is a purchased item it will be understood that the configurations of the cam discs were specified by applicant for operating in accordance with curve C1 of FIG. 6. The conjugate cam drive unit is of the type disclosed in the aforementioned U.S. Pat. Nos. to Kenny 3,525,268 and Lancaster et al 3,986,949.

The drive system 10 receives its power from the shaft 32 (FIGS. 1 and 2) of a motor 34. A first timing belt drive 36 comprises a cog belt 38 trained around cogged pulleys 40 and 42 keyed to continuously moving motor shaft 32 and input shaft 44 of the drive unit 30, respectively.

As will be described in more detail later, the internal components of the cam drive unit 30 intermittently drives an output shaft 46. The output shaft 46 is connected by an uninterrupted drive train, i.e., a drive train without clutch-brake units or the like, to one of the draw rolls. In this regard the output shaft 46 is connected to a jackshaft 48 by a second timing belt drive 50 which includes pulleys 52 and 54 keyed to the output shaft 46 and to the jackshaft 48, respectively. A cog belt 56 is trained over the pulleys 52 and 54.

A third belt drive 60 connects the jackshaft 48 to one end of a lower draw roll shaft 64 that is journaled in the frame F of the bag machine 12 and has the lower draw roll 16 secured thereto. The third timing belt drive 60 includes an endless cog belt 64 trained around pulleys 66 and 68 keyed to the jackshaft 48 and to the lower draw roll shaft 62.

Although the specification and claims refer to the three drives between the motor and lower draw roll as being belt drives, it will be understood that the term "belt drive" as used in the claims is to be construed broadly enough to cover equivalent chain and sprocket drives.

In order to easily adapt the drive system 10 to accommodate bags B (or other articles severed from the web) of different lengths, an adjustable journal box 69 (FIGS. 2 and 3) mounts the jackshaft 48 for eccentric movement relative to the frame F thereby providing means for varying the center-to-center distance between the output shaft 46 and the jackshaft 48 and also between the jackshaft 48 and the draw roll shaft 62.

The journal box 69 comprises a large diameter tube 70 rotatably received in a split block 71 bolted to the frame F. A pair of end caps 72,73 are bolted to the ends of the tube 70 and include bearings 74,76 that journal the jackshaft 48 for rotation upon an axis spaced from the axis of the tube 70. Thus, when adapting the bag machine 12 for making bags of different sizes, the pulleys 52,54,66 and 68 can be interchanged or replaced with other combinations of pulleys to provide drive ratios which will provide bags or other articles of desired length from the web W. The diameter of draw roll 16 can be modified to further provide web cut-offs not attainable by ratio changes. The tube 70 may then be pivoted in the split block 71, with the aid of a lever or the like (not shown) that is inserted in a hole 78 in one (or both) of the end caps to thereby tighten the belt 56. When the belt 56 is properly tensioned, capscrews 80 are tightened to clamp the tube 70 from movement in the split block 71.

The belt 64 of the third timing belt drive 60 may then be tensioned by positioning an idler pulley 82 (FIG. 1) against the belt. The pulley 82 is rotatably supported by an arm 84 having a split upper end (not shown) that is mounted on a pin secured to the frame F. When the belt is properly tensioned, the split end of the arm 84 is clamped to the pin by a capscrew.

If it is desired to change the bag production rate, the motor 34 which is preferably a variable speed motor is adjusted and/or the pulleys 40 and 42 of the first timing belt drive 36 may be interchanged or replaced by other pulleys to provide drive ratios which will result in the desired bag production rate provided there is maintained a one-to-one relationship between the draw roll indexing and the remaining cyclical function of the bag making machine. An idler roller 92 is urged against the belt 38 and is rotatably mounted on a slotted arm 94 that slidably engages and is bolted to the frame F.

As shown in FIG. 1, a fourth timing belt drive 106 connects the motor shaft 32 to a sealing head drive shaft 108 which has a cam 110 secured thereto for reciprocating the sealing and severing head 20; and a fifth timing belt 112 is connected between the shaft 108 and a shaft 114 to operate other components of the bag machine 12 all as fully described in my aforementioned patent.

In order to provide a general understanding of the conjugate cam drive unit 30 which is of the type disclosed by Kenny U.S. Pat. No. 3,525,268 and which unit forms a part of the combination of the present invention, the unit 30 has been diagrammatically illustrated in FIGS. 4 and 5.

The cam drive unit 30 comprises the housing 120 in which the continuously driven input or cam shaft 44 and the intermittently driven output shaft 46 are journaled. A pair of cams 122 and 124 are rigidly secured to the cam shaft 44. The cam 122 is in planar alignment with a first group 125 of cam follower rollers R1–R3; and the cam 124 is in alignment with a second group 126 of rollers R4–R6. The rollers in each group are journaled on a carrier 127 that is secured to the output shaft 46. The rollers of each group engage the peripheries of their associated cams one at a time. Also, at all times one roller in one group and one roller in the other group are simultaneously in firm engagement with the peripheries of their associated cams thus maintaining complete control over the alternate indexing (rotation) and dwell of the output shaft. In order to substantially prevent backlash between the two shafts 44 and 46, one of the shafts, for example shaft 46, is mounted in bearings 128 that are eccentrically and adjustably mounted in the housing 120. Thus, the shaft 46 may be adjusted so that two cam followers are at all times in firm engagement with their associated cams.

It will be understood that the input shaft 44 rotates 360° for each bag making cycle of the bag machine 12 although the draw rolls 14 and 16 (FIGS. 1 and 2) may index several revolutions during each cycle depending upon the particular pulley ratios of the belt drives 50 and 60 which determine the length of the bags being developed.

Figure 6:
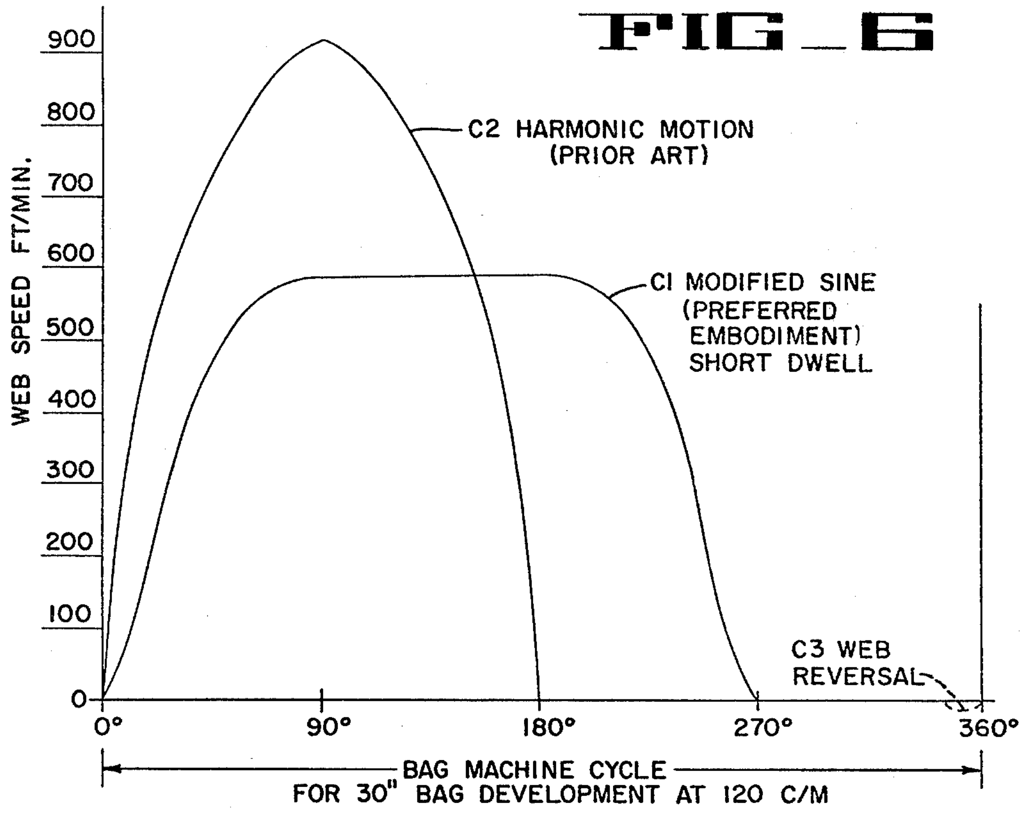
FIG. 6 is a cam diagram indicating web velocity when using a prior art harmonic motion drive system as compared to the web velocity when using the short dwell drive system of the preferred embodiment of the present invention when both systems are producing thirty inch bags at a production rate of 120 cycles or bags per minute.

In the preferred embodiment of the invention the contour of the cams 122 and 124, as amplified by the second and third timing belt drives 50 and 60, cooperate to form a modified sine web speed curve C1 as illustrated in FIG. 6. It will also be apparent from curve C1 that the web is being indexed or advanced during more than one half or 180° of the cycle of operation, while the web is being held stationary during a dwell that is less than 180° and at which time the bag is being sealed and severed. In the illustrated curve C1, 270° of the cycle is used to index the web and 90° of the cycle is dwell.

Indexing curve C2 of FIG. 6 illustrates the web speeds of a typical prior art clutch-brake controlled harmonic drive which advances the web during one half of the cycle and dwells during the other half of the cycle. Both curves C1 and C2 illustrate typical web speeds for a thirty inch bag development at 120 cycles (or bags) per minute.

As indicated by curve C2, the prior art harmonic motion type drive must accelerate and decelerate the web much faster than occurs with the drive system 10 of the present invention as is apparent from a comparison between curve C1 and C2. Also, the peak velocity of the web moved by the prior art harmonic motion drive is about 940 feet per minute as indicated by curve C2 which is more than one third faster than the peak speed of the web when driven by the cam controlled indexing drive system of the present invention as illustrated by curve C1.

Thus, it is apparent that the indexing drive system of the present invention provides a smoother and gentler indexing movement of the web at a lower peak velocity than was possible with the prior art harmonic motion bag machine drive system when operating with the same size bags and at the same production rate. It is also apparent that the long indexing, short dwell movement of the preferred embodiment illustrated in curve C1 provides only a single gradual acceleration to a peak velocity of about 575 feet per minute which velocity is maintained until the web is gradually decelerated to zero velocity. It is apparent that an intermediate deceleration and acceleration is not present in curve C1 but would be present with a dual or phased harmonic drive system designed to feed the web during more than one half of the cycle of operation.

Although the contour of the two cams 122 and 124 of the preferred embodiment of the invention provides a modified sine movement to the web which terminates at 270° of the cycle as indicated in curve C1, it will be understood that cams having different contours may be used to provide modified trapazoidal, cycloidal or other indexing motions and dwell periods if desired.

In certain bag making machines such as that disclosed in U.S. Pat. No. 3,813,998 which issued on June 4, 1974 to Ronald L. Lotto (which patent is incorporated by reference herein), the web is heat sealed at its leading edge to form thermoplastic bottom seal closed end first bags. However, the sealed forward ends of such bags tend to adhere to the seal bars and thus must be stripped from the seal bars before the web can be reliably indexed forward. If bottom sealed, closed end first bags are to be formed, the contour of the cams 122 and 124 is varied by adding a web reversing or strip back portion thereto as indicated in curve C3 (FIG. 6).

It is also apparent that the contours of the cams can be formed to terminate indexing movement at any point between 90° and 360° depending upon how much time is required during the dwell to perform the desired functions on the web. For example, if bags are being made from relatively thin thermoplastic webs as described above in regard to the preferred embodiment, in most cases a dwell of 90° is sufficient to perform the required functions. If the web is very thin, less dwell may be sufficient and cam contours providing more gentle acceleration and deceleration may be utilized. Furthermore, if the web is merely to be cut into sections of equal length, less than 90° of dwell would be required.

Figure 7:
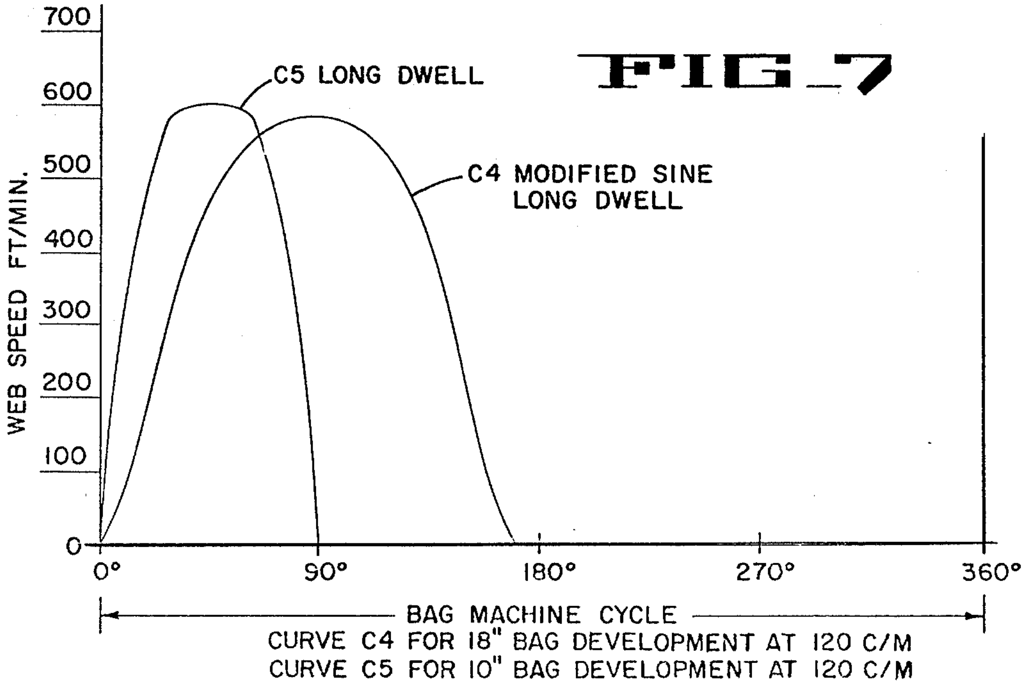

FIG. 7 illustrates diagrams for two long dwell cams for making bags or the like from very thick thermosealing webs at 120 cycles or bags per minute. Curve C4 illustrates a cycle which indexes the bag for about 170° and dwells for about 195° of the cycle. It will be noted that the acceleration, the peak velocity, and the deceleration is exactly the same as curve C1 of FIG. 6 and that bag lengths of approximately 18" will be formed.

Curve C5 discloses a long dwell cycle wherein indexing requires only 90° of the cycle leaving 270° for performing functions such as sealing and severing. The bag length will be about 10", while the acceleration and deceleration are maintained the same as prior art curve C2 with a peak velocity of less than 600 feet per minute.

It will be understood that if bags are being made and the web tends to stick to the seal bars, that the contours of the cams represented by curves C4 and C5 may also include a momentary web reversal portion similar to curve C3 of FIG. 6.

From the foregoing description it is apparent that the cam controlled short dwell indexing drive system of the preferred embodiment of the present invention gently and smoothly indexes the web during more than 180° of its cycle of operation thereby requiring a slower peak velocity than is required by prior art drive systems operating at the same production rate and bag length. The contours of the cams provide a single smooth acceleration and a single smooth deceleration, without undue inertia or backlash for each bag without requiring additional acceleration and decelerating motions of the web during indexing. An eccentrically mounted jackshaft and cooperating belt drives are included in the drive system and provide means for easily varying pulley ratios and therefore the length of the web being fed during each cycle of operation.

Other cam profiles may be used for special purposes such as making bags from thick thermoplastic webs wherein a long dwell of more than 180° is required for each cycle. Although the best mode contemplated for carrying out the present invention has been herein shown and described, it will be apparent that modification and variations may be made without departing from what is regarded to be the subject matter of the invention.

I claim:

1. A method of driving a web with a pair of web engaging rolls connected to an output shaft with at least one roll driven by indexing means including a pair of conjugate cam means on a driven cam shaft and cooperating groups of evenly spaced cam followers on the output shaft: the method comprising the steps of establishing an uninterrupted drive connection between said output shaft and at least one of the web engaging rolls during each complete cycle of operation for intermittently moving the web predetermined distances; contouring the pair of cam means for smoothly accelerating the web from zero velocity to a maximum velocity from a first point in a 360° cycle of operation which cycle includes a web indexing period and a web dwell period, and for maintaining said maximum velocity until again smoothly decelerating said web to zero velocity at a second point in said cycle, one of said periods exceeding 180° of said cycle, and maintaining backlash free uninterrupted driving control of the web's position during the entire cycle of operation by assembling one cam means on said driven shaft out of phase with the other cam means and by assembling each group of cam followers out of phase on the output shaft with a cam follower in each group being urged firmly against the associated cam means at all times during both its indexing and dwell periods.

2. A method according to claim 1 including the additional step of selectively varying the distance of movement of the web during said cycle of operation prior to being placed in operation by altering the diameters of pulleys includes in the uninterrupted drive connection.

3. A method according to claim 1 wherein said web includes two layers of a thermosealing material and additionally comprising the steps of applying heat and pressure to the web during said dwell period to seal said layers together.

4. A method according to claim 1 wherein said one period is the indexing period.

5. A method according to claim 4 wherein the portion of the cycle between said first and second points is about 270° of said cycle.

6. A method according to claim 5 and additionally comprising the step of momentarily reversing the direction of movement of the web immediately prior to said first point in said cycle by altering the contour of each cam means prior to being placed in operation to provide a web reversing portion positioned immediately before the web accelerating portions and which engage the associated groups of cam followers.

7. A method according to claim 1 wherein said one period is said dwell period.

8. A method according to claim 7 including the steps of selectively varying the distance of movement of the web during said cycle of operation prior to being placed in operation by altering the diameters of pulleys included in the uninterrupted drive connection.

9. A method according to claim 7 and additionally comprising the steps of momentarily reversing the direction of movement of the web prior to commencing the indexing operation by altering the contour of each cam means prior to being placed in operation to provide a web reversing portion positioned immediately before the web accelerating portion and which engages the associated groups of cam followers.

* * * * *